US010259753B2

(12) United States Patent
Chaudhry

(10) Patent No.: US 10,259,753 B2
(45) Date of Patent: Apr. 16, 2019

(54) MULTIFUNCTIONAL ORGANIC AGRICULTURAL FERTILIZER COMPOSITION AND PROCESS FOR PREPARATION THEREOF

(71) Applicant: Suunil Sudhakar Chaudhry, Jalgaon (IN)

(72) Inventor: Suunil Sudhakar Chaudhry, Jalgaon (IN)

( * ) Notice: Subject to any disclaimer, the term of this patent is extended or adjusted under 35 U.S.C. 154(b) by 147 days.

(21) Appl. No.: 15/327,272

(22) PCT Filed: Jan. 13, 2015

(86) PCT No.: PCT/IN2015/000017
§ 371 (c)(1),
(2) Date: Jan. 18, 2017

(87) PCT Pub. No.: WO2016/035090
PCT Pub. Date: Mar. 10, 2016

(65) Prior Publication Data
US 2017/0166488 A1    Jun. 15, 2017

(30) Foreign Application Priority Data
Sep. 1, 2014   (IN) .......................... 2784/MUM/2014

(51) Int. Cl.
*C05B 15/00* (2006.01)
*C05G 1/00* (2006.01)
*C05G 3/00* (2006.01)
*C05G 3/06* (2006.01)

(52) U.S. Cl.
CPC ................ *C05B 15/00* (2013.01); *C05G 1/00* (2013.01); *C05G 3/00* (2013.01); *C05G 3/06* (2013.01)

(58) Field of Classification Search
None
See application file for complete search history.

(56) References Cited

U.S. PATENT DOCUMENTS 5,861,048 A * 1/1999 Kamasaka ................ A23L 2/52
252/180
2012/0157317 A1   6/2012 Tanaka
2013/0192322 A1   8/2013 Miller

FOREIGN PATENT DOCUMENTS

CN          1044806 A      8/1990

* cited by examiner

*Primary Examiner* — Wayne A Langel
(74) *Attorney, Agent, or Firm* — Kramer Amado, P.C.

(57) ABSTRACT

The invention disclosed herein is a multifunctional agricultural organic bio-complexed composition comprising essential and non-essential nutritional elements; useful as a fertilizer, nutrient, bio-stimulant, complexing agent, pH controller, pH indicator, pH corrector, hard water salts in-activator, surface tension reducer, Spreader, penetrator, adjuvant, alkaline hard water ill effects mitigator, water conditioner and drip system irrigation cleaner. The invention also disclosed herein a process for preparation thereof.

20 Claims, 1 Drawing Sheet

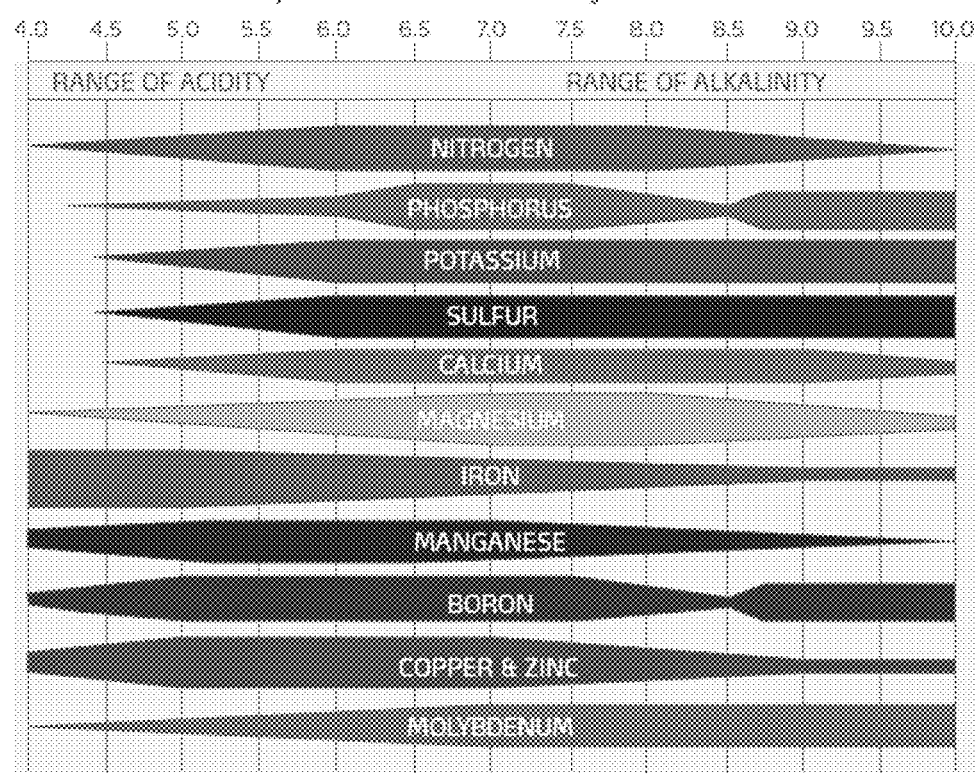

MULTIFUNCTIONAL ORGANIC AGRICULTURAL FERTILIZER COMPOSITION AND PROCESS FOR PREPARATION THEREOF

TECHNICAL FIELD OF THE INVENTION

The present invention relates to a multifunctional agricultural organic bio-complexed composition comprising essential and non-essential nutritional elements, individually or in combination, useful as a Fertilizer, nutrient, Bio-stimulant, Complexing agent, pH controller, pH corrector, pH indicator, hard water salts in-activator, Surface tension reducer, Spreader, alkaline hard water ill effects mitigator, adjuvant, penetrator, water conditioner and drip irrigation system cleaner.

The present invention also relates to a process for preparation of multifunctional agricultural composition.

BACKGROUND OF THE INVENTION

Plants require fertilizers for their proper development and better yield. Fertilizers are divided into macronutrients and micronutrients. Macronutrients are absorbed in larger quantities in the plant.

They include nitrogen (N), phosphorus (P), potassium (K), calcium (Ca), magnesium (Mg), and sulfur (S). Micronutrients are absorbed directly into the plant tissue and they include boron (B), chlorine (Cl), copper (Cu), iron (Fe), manganese (Mn), molybdenum (Mo), and zinc (Zn). These macronutrients and micronutrients containing fertilizers are applied to plants by mixing them into soil or directly applied to the foliar of the plants.

Many fertilizers are applied through application in the soil, via direct spraying or through irrigation. For many years, agriculture specialists have found higher yields when plants were fertilized through foliar feeding techniques, or more simply, applying the spray directly to the leaves. Spraying at the beginning or end of the day is crucial to maximize the growth of the plants. Because of this the photosynthesis, growth and yield of plants is improved.

Due to excessive use of chemical fertilizers, fertility of the soil is decreasing, soil health is deteriorating and environmental pollution is increasing. The farm products manufactured using chemical fertilizers, pesticides, weedicides etc. are showing some bad effects on health of people. Diseases like cancer are increasing due to increase of chemical pesticides in the vegetables, fruits, grains etc. Hence, the awareness to go for organically produced vegetables, fruits and grains is increasing. Farmers are also reducing the use of chemical fertilizers and opting for Organic farming methods. It's well-known that there are plenty of benefits of using Organic fertilizers, as they don't leave any residue, they keep improving the fertility of soil and making the plants strong from inside.

There are three major essential nutrients required for the proper growth of the plants and these are Nitrogen, Phosphorous and Potassium. The salient features of these nutrients are as follows:

Nitrogen is very important for Plant's Development. The use of nitrogen is well known to the growers. Nitrogen which is widely chosen for application in the form of urea is the most common source of the nitrogen used in agriculture as it gives quick green effect on plants by increasing chlorophyll content in plants. The other inorganic sources such as ammonium sulfate, ammonium phosphate, nitrate form of nitrogen such as ammonium nitrate are also used for supplying nitrogen to crops. However, nitrogen is either evaporated quickly or lost due to nitrification reaction. The effect of urea is quick but does not last long as urea is lost by mechanism stated above.

Farmers apply huge quantities of nitrogenous fertilizers and because of the problems mentioned above the actual effective use of nitrogen is less than 50% so in short more than 50% of applied urea fertilizer is wasted, thus, posing pollution and increasing burden of subsidy in Country's financial budget.

There are other Organic nitrogen sources available such as natural vegetable or animal, microbial origin protein based organic nitrogen. This organic nitrogen is very important because it's derived from peptides or amino acids which are the building blocks for any living thing. Peptides and amino acids are known as best natural chelating and nutrient transporters.

Phosphorous is very important for sturdiness of plants and its flowers. It is also important for increasing flowering and to prevent the flower shedding. The inorganic phosphorus sources for plants include super phosphate, diammonium phosphate (DAP), urea ammonium phosphate, ammonium phosphate, ammonium polyphosphate and the like. However, their availability to plants is very low.

Research has shown that the 75-95% of phosphorus fertilizer is tied up, or fixed, in the soil. The product prepared using this is a revolutionary technology that helps to solve the long-standing problem of poor phosphate availability and provides greater phosphate efficiencies, improved yield potential and increased profitability.

Potassium is also very important for sugar carbohydrate development in plants. Potassium is one of the important nutrient in protecting a crop against disease. It has the ability to make plant cells thicker, to strengthen the stalks and stems of plant and make it more difficult for certain diseases to invade the plant after a heavy rain or other stressful conditions. Potassium also plays vital role in photosynthesis.

Unfortunately, in the country like India where 75% of the population is dependent on agriculture and almost 300-400 million acres of arable land is available, manpower is available for farming but India is not self-sufficient in supplying three major nutrient fertilizers to the land under farming. Almost 75% of phosphate is imported from countries like China, USA, Morocco, Russia, Tunisia, Jordan and more than 95% of Potash is imported from Canada, Russia and Belarus. Indian Ministry of Agriculture has to import these fertilizers in huge quantities and supply farmers at subsidized rates. The subsidy burden is almost INR 68,000 Crore per year (USD 11 Billion/year) to Indian Government so it is very important to look for the fertilizers which has better efficiency, reduced wastage in soil, offer less pollution by avoiding fertilizer run off, offer better or equivalent effects without compromising on yield and save foreign exchange outgo for fertilizer import.

US Patent Publication No. 2012/0157317 discloses a concentrate in which the pH indicator is triarylmethane and the adjuvant is a carbohydrate (organic) acid for pH modification. US'317 provide composition in concentrated form which is diluted with water and apply to crops, soil or animals. The pH modifying agent used includes carbohydrate acid from glucoheptonic acid, gluconic acid, glucuronic acid, glucaric acid, mannonic acid, mannuronic acid, mannaric acid, galactonic acid, galactaric acid, galacturonic acid, guluronic acid, iduronic acid, ribonic acid, arabonic acid, xylonic acid, eruythronic acid, threonic vcid, tartaric acid and any composition thereof. US'317 also mentioned other acids such as acetic acid, orthophisphoric acid, citric acid, glutaric acid, glycolic acid, lactic acid, malonic acid, oxalic acid, phthalic acid, succinic acid, phosphorous acid, amino-tris(methylenephosphonic acids and etidronic acid.

US'317 discloses the use of carbohydrate acid for pH modification and triarylmethane dye for pH indication and mainly teaches that the product was used to treat the water for pH modification, however, it does not claim to possess or offer any fertilizing activity.

WO Publication No. 99/25189 discloses a concentrate for enhancing the activity of an agricultural chemical having a pH modifying group comprising, a) an active ingredient selected from one or more members of the group comprising pH modifying agents and water conditioning agent and b) pH indicator for coloring water, the pH indicator producing color change in water at a pH which the agricultural chemical has an acceptable agricultural activity;

the concentration of pH indicator in concentrate being sufficient that, when the agricultural chemical is added to spray water containing a predetermined amount of the concentrate, the pH indicator produces a visible color change in the spray water after addition of an agriculturally effective amount of the agricultural chemical.

WO'189 discloses the use of concentrate to add with agricultural chemicals for pH modification and pH indication and is mainly teaches that the product was used to treat the water for pH modification, however, it does not claim to possess or offer any fertilizing activity.

U.S. Pat. No. 5,728,648 relates to an improved fertilizing composition containing nitrogen, phosphorus and potassium, with the improvement being the addition of 1-methyl-4-(1-methylethenyl)cyclohexene (i.e. limonene) as an insecticide and fungicide.

An article titled, "Effects of nitrogen, phosphorus, potassium and calcium nutrition on strawberry anthracnose" by M. H. Nam et. al., published in Plant Pathology (2006) 55, 246-249, determine the effects of a range of concentrations of four nutrients—nitrogen, phosphorus, potassium and calcium in fertilizer solutions on the severity of anthracnose on strawberry cv. Nyoho cultivated under a non-circulation hydroponics system, after inoculation with Colletotrichum gloeosporioides.

An article titled, "Effects of Nitrogen, Phosphorus, and Potassium Fertilizers and of Organic Materials on the Composition of Washington Navel Orange Juice" by Winston W. Jones and E. R. Parker, published in American Society for Horticultural Science. The study determines the influence of nitrogen, phosphorus, and potassium fertilizers, and of manure and winter covercrops on the composition of the juice of the Washington Navel orange.

A thesis titled, "Effects Of Nitrogen Phosphorus and Potassium Fertilization on the Yield and Chemical Composition On Pole Beans" submitted to Oregon State College by Harry John Mack in June 1956, describes a study of the effects of nitrogen, phosphorus and potassium fertilization on the yield and chemical composition of pole bean plants grown under field conditions.

However, there are certain problems that are associated with the use of such type of fertilizers containing nitrogen, phosphorus and potassium.

1] The existing fertilizing elements like Nitrogen, Phosphorous or Potassium do not offer complete efficiency when applied.

Nitrogen from urea is either evaporated quickly or lost due to nitrification reaction, which renders its efficacy to 40%. Phosphorous having tendency to form complex with soil cations such as sodium, calcium, aluminium, iron etc. which renders its efficiency to just 25%. Potassium also forms complexes in soil with clay minerals and silicate ions, which affects its efficacy to some extent.

Thus, there remains a need to increase the efficiency of these fertilizing nutrients by reducing the evaporation/loss in case of nitrogen and complexation with cations in case of Phosphorous and Potassium.

2] Fertilizers containing Nitrogen (N), Phosphorous (P) and Potassium (K) tend to form complexes with the salts in irrigation water or in soil thereby reducing their efficiency and hence more quantity is required to use for better yields. The cations present in hard water sourced from underground renders the efficiency of N—P—K and makes them less effective.

Hence, the stable chemical or organic biocomplexed fertilizer composition is required which overcome the ill effects of hard water salts or cations presents in soil.

3] Water which is the most suitable and cost effective medium for applying fertilizers is generally sourced from underground and is found to be hard and alkaline in most of the places all over the world. When fertilizers are applied on the soil, large quantity of water is required for dilution and the water used for their dilution is mostly hard water sourced from ground well, river etc. While diluting or solubilising the inorganic fertilizers into such water, they comes in contact with hard water and the hard water salts tend to hydrolyze or form complex with inorganic fertilizers and renders them less effective. Thus, causes reduction in the uptake of fertilizers.

The hard water tends to reduce the efficiency of fertilizers and applied chemicals, and also affects the surface tension. Therefore, it is required to treat the water so that the ill effects of hard water can be avoided.

4] Further the inorganic sources of fertilizer when foliar applied are not absorbed in plants completely because the inorganic nature of the nitrogen, phosphorous and potassium does not allow them to go inside the leaf surface and they have to form complexes with some organic molecules (Organic molecules acting as transporter and are produced during the photosynthesis using C, H, O). If these organic molecules are not produced by plant in sufficient quantities then the nutrient transportation and absorption is greatly affected. However, if the nutrient fertilizer is made available as organic complex then its availability is greatly enhanced.

Therefore it is required to offer solution which will take care of multiple issues as following:

Solution to offer N—P—K, nutrients, agrochemicals in highly assimilable form so their maximum utilization can be achieved Solution which will also possess property to mitigate ill effects of hard water conditions and the hard alkaline water used for their dilution by correcting the water quality.

Solution which will give information to the grower about the correction in the pH of the solution used for spraying or irrigation consisting fertilizers, agrochemicals by imparting color change to solution at various pH value.

Solution reduces the losses of applied fertilizers by lowering volatilization losses or losses due to tie up with cations present in soil and water.

Solution which will offer better effects of applied nutrients, agrochemicals even at lower dosages by enhancing their effectiveness.

This is achieved in the present invention by using various compositions.

In order to achieve better yields Farmer has to use various products such as fertilizers, complexing agents, chelating agents, surfactants, stickers, pH buffers, pH meter/pH papers for improving efficiency of applied nutrients. Most of the farmers are not literate or do not have information of various products to be used for improving the efficiency of fertilizers. Hence, in order to overcome such problems there is a need to provide a better product which will offer multiple benefits in a single product.

SUMMARY OF THE INVENTION

In accordance with the above, it is an object of the present invention to provide a multifunctional organic bio-complexed agricultural composition comprising Nutrient sources and Phosphopeptides; wherein pH of the composition is maintained at <3. The composition is applied or mixed with N, P, K fertilizers such as urea, Single Super Phosphate, DAP, Potash or soluble fertilizers and maintained the pH of the soil nearby fertilizer applied region between 4 to less than 7 so as to slow down the volatilization of urea in soil and to inhibit the complexation/tie up of the other Nutrient sources with cations in soil or hard water salts in water.

Accordingly, in an aspect, the present invention provides essential nutritional elements selected from Nutrient sources such as N, P, K, trace minerals and vitamins; Complexing Agents; Peptides, Phosphopeptides and Carbohydrate source.

In another aspect, the present invention provides non-essential nutritional elements selected from pH indicator/s, surfactants, defoamers, antifoaming agent, penetrating agents, humectant and thickners/stabilizers.

In another aspect, the present invention provides a multifunctional agricultural organic biocomplexed composition comprising essential and non-essential nutritional elements, individually or in combination, which has multiple functions such as fertilizer, nutrient, biostimulant, complexing agent, pH controller, pH corrector, pH indicator, hard water salts in-activator, surface tension reducer, spreader, penetrator, adjuvant, alkaline hard water ill effects mitigator, water conditioner and drip irrigation system cleaner.

In yet another aspect, the invention also provides a process for preparation of multifunctional agricultural organic bio-complexed composition.

BRIEF DESCRIPTION OF FIGURE

FIG. 1: Depicts the influence of soil pH on availability of nutrient to plants. FIG. 1 display that most of the nitrogen is available between pH of 5 to 8 whereas phosphorous is best available between pH of 6.3 to 7.5 and potassium is best available between pH 5.5 to10. Further, the micronutrients like iron is best available between pH 4 to 6, manganese is 5 to 6.5 and boron between 5 to 7.5 whereas copper and zinc are best available in between pH 5 to 6.5.

DETAILED DESCRIPTION OF THE INVENTION

The invention will now be described in detail in connection with certain preferred and optional embodiments, so that various aspects thereof may be more fully understood and appreciated.

The present invention discloses a multifunctional organic bio-complexed agricultural composition comprising essential and non-essential nutritional elements.

Accordingly, in one preferred embodiment, the present invention discloses a multifunctional organic bio-complexed agricultural composition comprising Nutrient sources and Phosphopeptides; wherein pH of the composition is less than 3 so as to slow down the volatilization of urea in soil and to inhibit the complexation of the Nutrient sources with cations in soil or hard water salts in water.

In another embodiment, the present invention discloses a multifunctional organic bio-complexed agricultural composition comprising Nutrient sources and Phosphopeptides; wherein pH of the composition is maintained at <3. The composition is applied or mixed with N,P,K fertilizers such as urea, Single Super Phosphate, DAP, Potash or soluble fertilizers and maintain the pH of the soil nearby fertilizer applied region between 4 to less than 7 so as to slow down the volatilization of urea in soil and to inhibit the complexation of the Nutrient sources with cations in soil or hard water salts in water.

In another embodiment, the present invention discloses multifunctional agricultural composition which further optionally comprises essential and non-essential nutritional elements selected from complexing agent, peptides, carbohydrate source, trace minerals, vitamins, pH indicator/s, humectant, surfactants, defoamers, antifoaming agent, penetrating agents and thickners/stabilizers; either individually or in combination.

Accordingly, in another embodiment, the present invention discloses a multifunctional agricultural organic bio-complexed composition comprising essential nutritional elements selected from Nutrient sources such as Nitrogen (N), Phosphorous (P), Potassium (K); Complexing Agents; Peptides; Phosphopeptides; Carbohydrate source; trace minerals, vitamins; and non-essential elements selected from pH indicator/s, humectant, surfactants, defoamers, antifoaming agent, penetrating agents and thickners/stabilizers; wherein said composition is useful as a Fertilizer, nutrient, Bio-stimulant, Complexing agent, pH controller, pH indicator, pH corrector, hard water salts in-activator, Surface tension reducer, Spreader, penetrator, adjuvant, alkaline hard water ill effects mitigator, water conditioner and drip irrigation system cleaner.

The above described essential and non-essential elements can be used individually or in combination.

Accordingly in one typical embodiment, the present invention discloses a multifunctional organic biocomplexed agricultural composition comprising;
  a) Nutrient sources such as Nitrogen, Phosphorus and Potassium in an amount of 2-45%;
  b) Complexing Agents in an amount of 5-35%;
  c) Peptides in an amount of 5-30%;
  d) Phosphopeptides in an amount of 5-15%;
  e) Carbohydrate source in an amount of 3 to 10%;
  f) Trace minerals in an amount of 0.5-3%;
  g) Vitamins in an amount of 0.1-2.0%;
  h) pH indicator/s in an amount of 0.2-3%;
  i) Humectant in an amount of 0.1-2%;
  j) Surfactants in an amount of 3-10%;
  k) Defoamers and antifoaming agents are in an amount of 0.2-1%;
  l) Penetrating agents in an amount of 1-5% and
  m) Thickners/stabilizers in an amount of 0.05-0.1%.

The nutrient sources used in the present invention includes Nitrogen, Phosphorus and Potassium source.

Nitrogen sources such as anhydrous ammonia, liquor ammonia, urea, urea phosphate, thiourea, ammonium sulfate, ammonium nitrate, potassium nitrate, ammonium phosphate, ammonium polyphosphate, ammonium chloride, di-ammonium phosphate, urea triazone, Organic nitrogen sources such as proteins, peptides, nucleic acid, yeast extract, amino acids of natural vegetable, animal or microbial origin can be used. Other Organic nitrogen sources such as aromatic nitrogen or heterocyclic nitrogen such as hexamethylene tetra-amine, melamine, nitrobenzene can also be used; either individual or in combination. The nitrogen is present in an amount of 5 to 30% of the total composition.

Phosphorous sources such as various Phosphate salts, phosphoric acid, super phosphoric acid, phosphorous acid, polyphosphoric acid, HEDP (1-hydroxyethane 1,1-diphosphonic acid), AMP (Adenosine monophosphate), amino-tris (methylene phosphonic acid), phosphorous pentoxide, various phosphite salts, mono ammonium phosphate MAP (12-61-0), Di-ammonium phosphate (18-46-0), natural phosphate minerals such as Rock phosphate and natural phosphate sources such as bone meal, phospholipids and mixed fertilizers containing phosphorous; either individual or in combination. The Phosphorous is present in an amount of 5 to 45% of the total composition.

Phosphorus fixation is a problem with the soil, not with the crop. Once phosphorus has been applied to the soil and becomes fixed, there is no way to set it free. So it is very important to offer efficient source of phosphorous which will be required in lesser quantity and will have reduced phosphorus fixation in soil.

Potassium sources such as various potassium salts with organic or inorganic acids such as but not limited to Potassium chloride, potassium sulfate, potassium nitrate, potassium phosphate, potassium di hydrogen phosphate, di-potassium phosphate, mono-potassium acetate, potassium formate, potassium carbonate, potassium bicarbonate, tripotassium poly phosphate, potassium citrate, potassium acetate, potassium propionate, butyrate, potassium lactate, potassium phosphite, potassium hydroxide, potassium carbonate, potassium bicarbonate, tripotassium poly phosphate, potassium citrate and natural potassium minerals; either individual or in combination. The Potassium is present in an amount of 2 to 35% of the total composition.

Complexing agents are selected from Organic acids, Inorganic acids, natural amino acids and synthetic amino acids; either individual or in combination. These Complexing agents are present in an amount of 5 to 35% of the total composition.

Accordingly, organic acids are selected from any organic acid, amino acid, carbohydrate acid, carboxylic acids and the like, either individually or in combination.

Organic acids further includes Citric acid, malic acid, Maleic acid derived from maleic anhydride, itaconic acid, polymaleic acid, polyaspartic acid, fumaric acid, malonic acid, tartaric acid, oxalic acid, phthalic acid, glycolic acid, lactic acid, propionic acid, malic acid, succinic acid, acrylic acid, ascorbic acid, gluconic acid, glacial acetic acid, vinegar, propionic acid, formic acid, butyric acid, butanoic acid, fulvic acid, humic acid, folic acid, EDTA, Nitrilotriacetic acid (NTA), DTPA (Diethylene Triamine Penta Acetic Acid), EDTA salts, Hydroxy ethylidine Phosphonic acid (HEDP), Adenosine monophosphate (AMP), amino-tris (methylene phohonic acid), lignosulfonic acid, glucoheptanioc acid, gluconic acid, glutaric acid, glucaric acid, glucoronic acid, ribonic acid, mannoric acid, arabonic acid, galactonic acid, mannuronic acid, erythronic acid, threnic acid and xylonic acid.

Organic acids are used to form complexes with hardness causing salts present in water and soil, inactivate the hard water salts, mitigate hard water ill effects and conditions water. Additionally they also offer complexation with Nitrogen, Phosphorus and Potassium.

Inorganic mineral acids for complexation are selected from Phosphoric acid, nitric acid, sulfuric acid, phosphorous acid and hydrochloric acid. These are used to form complexes with hardness causing salts present in water and soil and inactivate the hard water salts and conditions water.

Amino acids can be either compound mixed amino acids sourced from natural origin products by hydrolyzing the proteinous source by chemical, enzymatic or combination of both hydrolysis methods; or synthetic amino acids in the form of amino acids or their salts such as glycine, glutamic acid, lysine Hydrochloride, lysine, aspartic acid, polyaspartic acid, polyglutamic acid, methionine, hydroxyproline, tryptophan, arginine, valine, histidine, methionine, proline, thioproline. Synthetic Amino acids acts as synthetic chelating agent and nitrogen supplement. They form complexes with hardness causing salts present in water and soil, inactivate the hard water salts and conditions water and in addition offer nitrogen to crops.

Peptides act as natural nutritional supplement and natural chelating agents. They form complexes with N, P, K and also with hardness causing salts present in water and soil. They inactivate hard water salts, mitigate hard water ill effects and further conditions the water. They improve uptake of nutrient in plant tissue.

Peptides are sourced from hydrolyzing natural vegetable or animal or microbial origin proteins using enzyme or acid, alkali digestion. The peptide can be from any of the sources such as cereals, corn, soy, pea, wheat, guar, pulses, oilseeds cakes, animal origin products of slaughter house byproducts, leather processing byproducts, animal hide, bone remains, horn n hoof, hair, duodenum, animal excreta, earthworm extract, animal extract, food processing by products containing proteins, mushroom compost, mushroom growing media waste, fish meal, fish processing industries byproducts, microbial origin such as yeast and yeast extract. These peptides are used individually or in combination at any ratio and are present in an amount of 5-30% of the total composition.

Phosphopeptides includes complexation product of organic acids and bio-complexing agent such as peptides, amino acids, hydrolyzed proteins with any phosphorous source such as phosphoric acid, super phosphoric acid, phosphorous acid, polyphosphoric acid, phosphorus salts, but not limited to Di-ammonium phosphate, mono-ammonium phosphate, potassium phosphate, potassium di-hydrogen phosphate, HEDP, Adenosine monophosphate (AMP), amino-tris (methylene phohonic acid) and mixed fertilizers containing phosphorous. The Phosphopeptides are present in an amount of 5 to 15% of the total composition.

These sources of Phosphopeptides does not get complexed with cations in soil or hard water salts in water, hence, the efficiency of Phosphopeptides is much better than inorganic Phosphorous salts used in agriculture like Single Super Phosphate, Mono-ammonium Phosphate and Di-ammonium Phosphate to name a few.

The bio-complexed phosphopeptide of the present invention is used in lesser quantity as compared to other inorganic phosphorous sources. These are applied either through soil or through foliar spraying, because of its binding with multiple complexing agents involving peptides, organic acids and amino acids.

Carbohydrate source used are selected from molasses, sugar, canesugar or jaggery or sugar alcohols such as mannitol, sorbitol and glycerine. These carbohydrate sources are used either individual or in combination for better uptake of nutrients which facilitates the transportation of nutrients to various parts of plant. The Carbohydrates are present in an amount of 3 to 10% of the total composition.

The carbohydrate source also includes Sugar-mannose, lactose, dextrose, erythrose, fructose, fucose, galactose, glucose, gulose, maltose, polysaccharide, raffinose, ribose, ribulose, rutinose, saccharose, stachyose, trehalose, xylose, xylulose, adonose, amylose, arabinose, fructose phosphate, fucose-p, galactose-p, glucose-p, lactose-p, maltose-p, mannose-p, ribose-p, ribulose-p, xylose-p, xylulose-p, deoxyribose, corn steep liquor, whey, corn sugar, corn syrup, maple syrup, grape sugar, grape syrup, beet sugar, sorghum molasses, cane molasses, mineral salts lignosulfonate sugar alcohol-adonitol, galactitol, glucitol, maltitol, mannitol, mannitol-p, ribitol, sorbitol, sorbitol-p, xylitol and the like; either individually or in combination.

In another embodiment, the multifunctional agricultural composition optionally comprises trace Minerals and vitamins The minerals includes salts of inorganic or complexed/chelated zinc, copper, manganese, iron, boron, silicon, molybdenum, cobalt, vanadium, sulphur, magnesium, calcium and the like either individual or in combination.

The total mineral content ranges from 0.5-3.0%, preferably 0.5-2.0%. The content of individual mineral is Zinc 20-40%, Manganese 20-40%, Copper 10-15%, Iron 10-20%, Cobalt 4-15%, magnesium 10-15%, calcium 5-8%, Molybdenum 5-10% and Vanadium 5-6%.

Vitamins include Vitamic C, Vitamin B12, B1, B6, Inositol, Folic acid and Choline in the form of their salts either individual or in combination. Vitamin content ranges from 0.1-2.0%. The content of individual vitamin is Vitamin C 30-50%, Vitamin B6 5-8%, Vitamin B12 1-2%, Vitamin B1 5-8%, Folic acid -20-30%, Choline 35-40%, and Inositol 5-6%.

In one typical embodiment, the present invention discloses a multifunctional organic agricultural composition comprising non-essential elements that are selected from pH indicators, humectants, surfactants, penetrating agents, defoamers, antifoaming agents and thickners/stabilizers.

pH indicators used are selected from wide variety of indicators as shown in Table 1. As the final pH desired is Acidic, any of the following pH indicators or combinations thereof is used to show the pH of the final solution applied in the field.

TABLE 1

| Indicator | Color at given pH level | | Color at given pH level | |
|---|---|---|---|---|
| Methyl Red | Yellow | at pH 6.3 | Red | at pH 4.2 |
| Methyl Red + Methylene Blue screened | Green | at pH 6.3 | Purple | at pH 4.2 |
| Alizarin Red S + Methylene Blue | Purple | at pH 6.0 | Green | at pH 4.6 |
| Bromocresol Green + Methyl Red | Green | at pH 5.2 | Pink | at pH 4.2 |
| Bromocresol Green + Methylene Blue | Blue | at pH 5.4 | Green | at pH 3.8 |
| Bromocresol Green | Blue | at pH 5.4 | Yellow | at pH 3.8 |
| p-nitrophenol + Methylene Blue | Green | at pH 6.6 | Blue | at pH 5.4 |
| Ethyl Red + Methylene Blue | Purple | at pH 5.8 | Blue | at pH 4.0 |
| 2,5 di-nitrophenol | Yellow | at pH 5.8 | Colorless | at pH 4.0 |
| 2,5 di-nitrophenol + Methylene Blue | Green | at pH 5.8 | Blue | at pH 4.0 |
| Bromoxylenol Blue | blue | at pH 5.6 | yellow | at pH 4.0 |
| Methyl Yellow | yellow | at pH 4.5 | red | at pH 3.2 |
| Methyl Orange | yellow | at pH 4.5 | red | at pH 3.2 |
| Bromothymol Blue + Methylene Blue + Methyl Red | Blue | at pH 7.6 | Green Purple | at pH 6.0 at pH 4.6 |

TABLE 1-continued

| Indicator | Color at given pH level | | Color at given pH level | |
|---|---|---|---|---|
| Naphtyl Red | yellow | at pH 5.0 | red | at pH 3.7 |
| Bromophenol Red | purple | at pH 7.0 | yellow | at pH 5.2 |
| chlorophenol Red | purple-red | at pH 6.6 | yellow | at pH 5.2 |
| Alizarin Red | red | at pH 6 | yellow | at pH 4.4 |
| Cochineal | purple | at pH 6.2 | yellow | at pH 4.8 |
| Azolitmin | Red | at pH 4.4 | Blue | at pH 6.6 |
| Bromophenol Blue | Blue | at pH 4.6 | yellow | at pH 3.0 |
| Congo Red | Red | at pH 5.0 | Blue | at pH 3.0 |
| Resazurin | Violet | at pH 6.4 | Orange | at pH 3.8 |
| P-nitrophenol | Yellow | at pH 6.6 | colorless | at pH 5.4 |
| Bromocresol Purple | Purple | at pH 6.8 | yellow | at pH 5.2 |
| Bromothymol Blue | Blue | at pH 7.6 | yellow | at pH 6.0 |
| Universal pH Indicator comprising mixture of pH indicators | Blue | at pH 7.5 | Red | at pH 4.5 |

The pH indicators are used either individual or in combination and present in an amount of 0.2-3% of the total composition.

Most of the times the pH of water used for agriculture application is alkaline and it affects the performance of the applied fertilizers hence it is required to reduce the pH of the water to improve the performance of applied fertilizer nutrients. The pH indicator added in the present composition is used to know the pH of the solution. Grower can add the organic bio-complexed agricultural composition of the present invention in water which also acts as pH controller, pH indicator and pH corrector, so that the grower can understand if the pH of water is appropriate or optimum to achieve better efficiency of applied fertilizers. The optimum pH of water used for spraying or irrigation,is acidic <7.0 because at this pH the absorption of nutrients is high (Refe the diagram) and preferably ranging in between 4 to less than 7.

Humectants used are from natural or synthetic origin such as sugar alcohols such aglycerine, sorbitol, mannitol, xylitol, maltitol, honey, glycols such as ethylene glycol, propylene glycol, polyethylene glycol, urea and the like which will maintain the humidity on the leaf surface and improve the uptake of nutrients and they are for maintaining the humidity on leaf surface. The Humectants are present in an amount of 0.1 to 2% of the total composition.

Surfactants used for reducing surface tension on leaf surface are chosen from Nonionic surfactant, anionic surfactant such as Nonylphenol-ethylene oxide condensate, Tallow amine ethylene oxide condensate, Sorbirtan monoolate, silicone surfactant, polysiloxane based surfactant, Sodium lauryleth sulfate, SLS, Linear alkyl benzene sulfonic acid, dioctyl sulfosuccinate and alkyl olefin sulfonate. Natural surfactants such as soapnut extract and Yucca extract. These surfactants are used either individually or in combination. The surfactants are present in an amount of 3 to 10% of the total composition.

Penetrating agents includes various solvents such as alcohols, pine extracts, natural oils and petroleum oils. The Penetrating agents are present in an amount of 1 to 5% of the total composition.

Defoamers and antifoaming agents are used to reduce the foaming while spraying. These include various defoamers based on silicone defoamers, kerosene defoamers, wax defoamers, oil based deformers such as turkey red oil and fatty acid based defoamers. The Defoamers and antifoaming agents are used either individual or in combination and are present in an amount of 0.2 to 1% of the total composition.

Thickners/stabilizers such as natural polymers such as Carboxymethyl cellulose (CMC), guar gum, locust bean gum, xanthan gum, natural gums, hydroxyethylcellulose (HEC), HPMC or synthetic polymers based on acrylates, polyacrylamide (PAM), PVP or combination of synthetic polymers and carbomers. The thickeners are present in an amount of 0.05 to 0.1% of the total composition.

In yet another preferred embodiment, the present invention discloses the process for preparation of multifunctional organic agricultural composition, wherein the above mentioned essential and non-essential nutritional elements are thoroughly reacted at 50-90° C. under high speed stirring for 8-18 hours in glass lined reactor. The reacted mass is then milled in either in wet mill, ball mill, sand mill or air jet milling machine to get fine micron sized particles of composition having size of approx. 100 nanometer to 10 micron more preferably 0.1-1 micron to 5.0 micron. The pH of the final composition is maintained acidic that is less than 3 using various ingredients selected from complexing agents comprising organic and inorganic mineral acids mentioned above, either individual or in combination.

In another embodiment, the multifunctional organic agricultural composition is prepared in various forms such as solid powder, granule, paste, liquid, gel, pellet, pills, capsule or tablet.

In another embodiment, the multifunctional organic agricultural composition shows its effectiveness on all crops varieties such as tomato, brinjal, soybean, cotton, onion, potatoes, cereals corn, wheat, rice, sorghum, bajra, grains, pulses crops, fruits, vegetables, plantation crops, vegetables, sugarcane, oilseed crops, tea and the like, that can lead to even higher yield potential.

The agricultural composition of present invention can be applied on leaves by sprinkler application, sprayer application or drip application. The composition can also be mixed with soil or added during irrigation; mixed with fertilizers or impregnated or coated on fertilizers; or mixed with pesticides, weedicides and plant growth regulators.

The multifunctional agricultural composition is applied at the dosage of 50-250 ml per acre in sufficient quantity of water may be 100 liter water for high volume sprayer such as backpack knapsack sprayer for foliar spraying to get various benefits. For soil applications 2-5 ltr/acre through soil drench in 1:2000 dilution at each stage in crop cycle. Minimum 2 to 3 applications are advised at various stages for better results.

In an embodiment, the present invention discloses the use of multifunctional organic agricultural composition comprising essential and non-essential nutritional elements of the present invention; as a fertilizer, nutrient, Bio-stimulant, Complexing agent, pH controller, pH indicator, pH corrector, hard water salts in-activator, Surface tension reducer, Spreader, penetrator, adjuvant, alkaline hard water ill effects mitigator, water conditioner and drip irrigation system cleaner.

The multifunctional agricultural organic bio-complexed composition of the present invention has multiple advantages/benefits such as—

1. The composition when mixed with urea slows down the volatilization of the urea. It also reduces the complexation/tie up of phosphorous and potassium with the cations present in soil such as calcium, aluminium, sodium, iron and the like. Thus improves the fertilizer efficiency greatly.
2. Supplements synthetic, natural, complexed fertilizing element to plants which are easily assimilable by plants. Composition of the present invention offer nutrients in complexed form with peptide and organic acids and is simultaneously offer pH balancing. These elements are made available to plants at optimum pH level which also improves their uptake in addition to their easy assimilation due to complexation.
3. Increases phosphate availability through all stages of plant growth, including the early development period crucial for increasing yield potential by supplementing organically bio complexed phosphorous in the form of phosphopeptide in order to make the plant strong, improve its vigor and enhance disease resistance.
4. Supplement peptides, phosphopeptide to plants to impart bio-stimulating effect for profuse flowering and strong flowering in order to reduce the flower shedding.
5. Supplements organic nitrogen to plants which is easily assimilable by plants for enhancing photosynthesis action.
6. Conditions alkaline hard water used for spraying or irrigation by inactivating hardness causing salts such as carbonates, bicarbonates, sulfates, chlorides etc. salts of minerals not limited to salts of calcium, magnesium, sodium in water which are responsible for inactivating or reducing the efficiency of foliar applied nutrients, pesticide, insecticides, fungicide, PGR etc.
7. Reduce the pH of alkaline water to make it optimum by reducing it to a desired level of 4 to less than 7 in order to increase the absorption of desired active substances in the leaf surface.
8. Automatically indicating the pH of the spray or irrigation water by certain color imparted to the water because of presence of certain pH indicators.
9. Reduces the surface tension on the leaf as well as in soil and improves the coverage of fertilizers, amino acids, peptides, phosphopeptides and applied nutrients and chemicals on the leaf surface.
10. Compatible with most all the agrochemicals except very few alkaline such as copper hydroxide.
11. Ease in using in spite of offering so many benefits.

The following example, which includes preferred embodiments, will serve to illustrate the practice of this invention, it being understood that the particulars shown are by way of example and for purpose of illustrative discussion of preferred embodiments of the invention.

EXAMPLES

Example 1

| Sr. No. | Ingredients | Quantity |
|---|---|---|
| 1. | Nutrients N, P, K | 2-45% |
| 2. | Peptides | 5-30% |
| 3. | Phosphopeptides | 5-15% |
| 4. | Complexing agents | 5-35% |
| 5. | Carbohydrates | 3-10% |
| 6. | Trace minerals | 0.5-3% |
| 7. | Vitamins | 0.1-2.0 |
| 8. | pH indicators | 0.2-3% |
| 9. | Surfactant | 3-10% |
| 10. | Humectant | 0.1-2% |
| 11. | Penetrating agent | 1-5% |
| 12. | Thickners/Stabilizers | 0.05-0.1% |
| 13. | Defoamers | 0.2-1% |
| | Total | 100% |

As different nutrient levels are required in different stages of crops, the nutrient level and complexing agents, peptides in the compositions are required changes in order to achieve better effectiveness of the composition of present invention.

| Ingredients | Example No. 2 Stage 1 Parts/Parts | Example No. 3 Stage 2 Parts/Parts | Example No. 4 Stage 3 Parts/Parts | Example No. 5 General | Example No. 6 General | Example No. 7 |
|---|---|---|---|---|---|---|
| Functional Ingredients | | | | | | |
| Nitrogen | 5-20 | 5-13 | 5-10 | 5-8 | 5-20 | 5 |
| P2O5 | 5-10 | 5-40 | 5-10 | 10-35 | 5-15 | 33 |
| K2O | 5-10 | 2-3 | 5-24 | 2 | 5-10 | 2 |
| Complexing agents | 6-11 | 5-18 | 15-30 | 10-20 | 10-35 | 12 |
| Peptide | 15-30 | 15-30 | 15-25 | 15-18 | 15-27 | 18 |
| Phospho-peptide | 5-10 | 5-10 | 5-10 | 5-10 | 5-10 | 8 |
| Carbohydrates | 3-6 | 3-8 | 3-6 | 5 | 3-6 | 5 |
| Trace Minerals | 0.5-3.0 | 0.5-1.0 | 0.5-2.0 | 0.5 | 0.5 | 0.8 |
| Vitamins | 0.1-2.0 | 0.1-2.0 | 0.1-2.0 | 0.1-2.0 | 0.1-2.0 | 0.15 |
| Non-functional ingredients | | | | | | |
| pH indicator | 0.5-2.0 | 0.5-2.0 | 0.5-2.0 | 0.5-2.0 | 0.5-2.0 | 0.8 |
| Surfactant | 4-8 | 4-8 | 4-8 | 4-8 | 4-9 | 5 |
| Penetrator | 3-5 | 3-5 | 3-5 | 3 | 3 | 4.95 |
| Humectant | 1-2 | 1-2 | 1-2 | 1 | 1 | 1 |
| Defoamer | 0.2 | 0.2 | 0.2 | 0.2 | 0.2 | 0.2 |
| Thickner/Stabilizer | 0.1 | 0.1 | 0.1 | 0.1 | 0.1 | 0.1 |
| Total | 100% | 100% | 100% | 100% | 100% | 100% |

Stage 1-Vegetative growth
Stage 2-Bloom phase
Stage 3-Fruiting and Fruit development phase

Example 8

Application of Compositions of Present Invention (Example No. 3 and 5) Showing Reduced Urea Volatilization Urea Volatilization:—The major loss of urea Nitrogen in broadcast applications is due to volatilization. Volatilization is the loss of gaseous NH3 to the air. The main factor in creating ammonia loss from urea is hydrolysis.

Urea Breakdown:
$CO(NH_2)+Water \rightarrow (NH_4)_2CO_3$
Urea+water→Ammonium carbonate
$(NH_4)_2CO_3+H_2O \rightarrow 2NH_4+H_2O+CO_2$
Ammonium carbonate+water→Ammonium ion+water+carbon dioxide The loss of urea by hydrolysis begins with the breakdown of the urea molecule.

Volatilization losses of urea are influenced by soil temperature, soil texture, soil pH, moisture/humidity. The worst case scenario for loss is applying to soil with pH.7.5, wet soil surface, high humidity. We cannot control soil surface, humidity and wet soil surface during rainy season.

At the site of the urea granule in particular the center of the granule the pH rises rapidly.

During hydrolysis ammonia is released causing the pH to rise. Higher the pH rises the more the ammonia is released. The ammonia loss is faster in a sandy low CEC soil because it has low buffering capacity.

Sandy soil (low CEC) cannot stop the rapid rise in pH the way a high CEC soil with higher buffering capacity can.

However soils that have a higher pH to begin with >7.5 will promote more ammonia loss as they encourage the reaction to evolve ammonia. Percent of surface applied urea volatilized as ammonia is influenced by soil pH and day's urea is left on the surface. A high pH soil will have a faster loss of urea.

Experiment was carried out to check the effect of compositions of present invention to see the efficiency to prevent volatilization in urea.

TABLE 1

| Ambient Temp | 24° C. |
|---|---|
| Treatment 1 (T1) | Plain Urea application at 50 Kg per acre in soil |
| Treatment 2 (T2) | 50 Kg Urea applied in soil treated with 1 ltrs of composition as per Example No. 3 |
| Treatment 3 (T3) | 50 Kg Urea applied in soil treated with 1 ltrs of composition as per Example No. 5 |
| Treatment 4 (T4) | 50 Kg Urea coated with Godrej Nimin* urea coating agent for reduced urea loss |

*Godrej Nimin is a Commercial product based on Neem derivative fatty acids

It is noted that the pH of urea in soil in treatment T2 and T3 was adjusted to 4.5 to 5.0 due to addition of composition of invention.

The soil samples were collected from various selected locations wherever urea is applied and then checked for nitrogen content in laboratory after 0, 2, 4, 6, 8 and 10 days of urea application.

The compositions as per Example No. 3 and 5 of the present invention when used with the urea fertilizer showed the results as per following Table 2:—

TABLE 2

| | pH | | | |
|---|---|---|---|---|
| Days | Treatment T1 pH achieved of urea in soil pH = 7.5 Loss % | Treatment T2 pH achieved of urea in soil pH = 5.0 Loss % | Treatment T3 pH achieved of urea in soil pH = 5.0 Loss % | Treatment T4 Loss % |
| 0 days | 0 | 0 | 0 | 0 |
| 2 days | 5 | 0 | 0 | 3 |
| 4 days | 20 | 2 | 2 | 12 |
| 6 days | 30 | 5 | 6 | 18 |
| 8 days | 33 | 9 | 9 | 22 |
| 10 days | 45 | 10 | 11 | 26 |

Conclusion:—It is noted that the loss of urea is minimized substantially. The total urea loss of untreated plot is 45% while that of treated with the compositions of present invention is just 11% of the initial value. So the loss of urea from treated fertilizer is just 25% (¼th) of the untreated control. It is observed that almost 75% of the urea volatilization is prevented using the composition of present invention. This shows that the reduced loss of urea due to volatilization can be achieved and efficiency of urea can be thus increased if treated with the composition of present invention. The other commercial product Godrej Nimin offered reduction in urea volatilization by 42% than that of control treatment T1.

The complexing agents, acids and peptides along with surfactants and penetratents go inside/migrate into the urea granule to form bond with urea. This bond slows down the rate of conversion of urea into ammonium carbonate and then into ammonia. Conversion of urea into ammonia is inhibited by maintaining the pH inside and nearby the surrounding of urea granule.

Example 9

Application of Composition of Present Invention (Example No. 6) Showing Phosphorous Activation It is noted that applied phosphorous fertilizer is always tied up with the cations such as calcium, aluminium, iron, magnesium found in the soil. These cations quickly fix phosphorous and reduce its efficiency by almost 75%. The compositions of present invention when coated or applied along with phosphate fertilizers inhibit the fixation of phosphate fertilizer by protecting the phosphorous in fertilizer and offers better phosphorous availability due to the complexing and bio-complexing agents such as peptides of the composition. The peptides in addition increase the absorption of P in plants.

Soils with inherent pH values between 6.2 and 7.5 are ideal for P-availability, while pH values below 5.5 and between 7.5 and 8.5 limits P-availability to plants due to fixation by aluminum, iron, or calcium.

Bio-complexed compositions of present invention additionally help to maintain the pH of the soil at the level where the phosphorous remain in available form i.e. 6.3 to 7.5.

TABLE 3

| | |
|---|---|
| Ambient Temp | 24° C. |
| Treatment 1 (T1) | Control, use of Di Ammonium Phosphate (DAP) at 50 Kg per acre + Urea 50 Kg + Potash 48 Kg |
| Treatment 2 (T2) | Coating of 750 ml of composition of Example No. 06 diluted in 500 ml water on 50 Kg DAP + Urea 50 Kg + Potash 48 Kg |

Crop:—Paddy
Application Time:—

Fertilizer @ 32:23:30 kg NPK/acre (50 kg Urea, 52 kg DAP and 48 kg Muriate of Potash) is applied to transplanted rice. All P and K and 50% of N are applied as basal dose and 25% N at maximum tillering and rest 25% N at panicle initiation stage. Application of nitrogen fertilizer in split doses reduces losses, facilitates its efficient use, improve growth and yield of rice.

TABLE 4

Compositions of Example 6

| Ingredient | Example No. 6 | Composition as per Example No. 6 |
|---|---|---|
| Functional Ingredients | | |
| Nitrogen | 5-20 | 15 |
| P2O5 | 5-15 | 10 |
| K2O | 5-10 | 3 |
| Complexing agents | 10-35 | 25.5 |
| Peptide | 15-27 | 20 |
| Phosphopeptide | 5-10 | 8 |
| Carbohydrates | 3-6 | 5 |
| Trace Minerals | 0.5 | 0.5 |
| Vitamins | 0.1-2.0 | 0.1 |
| Non-functional ingredients | | |
| pH indicator | 0.5-2.0 | 0.8 |
| Surfactant | 4-9 | 8 |
| Penetrator | 3 | 3 |
| Humectant | 1 | 1 |
| Defoamer | 0.2 | 0.2 |
| Thickner/Stabilizer | 0.1 | 0.1 |

TABLE 5

Yield Results for Paddy/Rice:-

| Treatment | Farm 1 | Farm 2 | Average Yield/acre | Average Yield Increase |
|---|---|---|---|---|
| Control (T1) | 17.50 qtl/acre | 16.85 qtl/acre | 17.175 qtl | NA |
| Composition of invention as per Example No. 06 (T2) | 24.60 qtl/acre | 24.40 qtl/acre | 24.50 qtl | +42.60% |

Example 10

Application of Composition of Present Invention (Example No. 2, 3 and 4) on Maize Crop Crop:—Maize
Recommended Dose:—N:P:K=80:20:30
Control Dosages:—N:P:K=80:20:30 Kg per acre
Fertilizer used:—Nitrogen from Urea N 46-0-0, Phosphorous from Di-ammonium phosphate 18-46-0 and Potassium from Potash 0-0-60

TABLE 6

Compositions of Example No. 2, 3 and 4

| Ingredient | Example No. 2 | Composition as per Example No. 2 Used in Stage 1 | Example No. 3 | Composition as per Example No. 3 Used in Stage 2 | Example No. 4 | Composition as per Example No. 4 Used in Stage 3 |
|---|---|---|---|---|---|---|
| Functional Ingredients | | | | | | |
| Nitrogen | 5-20 | 17 | 5-13 | 8 | 5-10 | 6 |
| P2O5 | 5-10 | 10 | 5-40 | 33 | 5-10 | 8 |
| K2O | 5-10 | 6 | 2-4 | 2 | 5-24 | 22 |
| Complexing agents | 6-11 | 10 Citric acid + malic acid (1:1) | 5-18 | 14 | 15-30 | 24 |
| Peptide | 15-30 | 27 | 15-30 | 19.25 | 15-25 | 21 |
| Phosphopeptide | 5-10 | 8.45 | 5-10 | 8 | 5 | 5 |
| Carbohydrates | 3-6 | 5 Molassses + Jaggaery (1:1) | 3-8 | 5 | 3-6 | 4.55 |
| Trace Minerals | 0.5-2.0 | 1.5 (Zn 20%, Cu10%, Mn-20%, B-5% | 0.5-1.0 | 0.8 | 0.5-2.0 | 0.5 |
| Vitamins | 0.1 | 0.1 | 0.1-2.0 | 0.15 | 0.1-2.0 | 0.15 |

TABLE 6-continued

Compositions of Example No. 2, 3 and 4

| | Example No. 2 | Composition as per Example No. 2 Used in Stage 1 | Example No. 3 | Composition as per Example No. 3 Used in Stage 2 | Example No. 4 | Composition as per Example No. 4 Used in Stage 3 |
|---|---|---|---|---|---|---|
| Non-functional ingredients | | | | | | |
| pH indicators | 0.5-2.0 | 0.8 Methyl Red + Methylene Blue (2:1) | 0.5-2.0 | 0.5 (Methyl Red) | 0.5-2.0 | 0.5 Bromocresol green + Methyl Red in 60:40 |
| Surfactant | 4-8 | 8 | 4-8 | 4 | 4-8 | 4 |
| Penetrator | 3-5 | 5 | 3-5 | 4 | 3-5 | 3 |
| Humectant | 1-2 | 1 | 1-2 | 1 | 1-2 | 1 |
| Defoamer | 0.2 | 0.1 | 0.2 | 0.2 | 0.2 | 0.2 |
| Thickner/Stabilizer | 0.1 | 0.1 | 0.1 | 0.1 | 0.1 | 0.1 |

Application Details:—
Treatment No. 1 (T1):—Control Untreated:—As Per Regular Practice of Farmers Fertilizer dosages N P K=80:20:30 per acre taken from conventional sources Nitrogen sourced from Urea N 46-0-0, Phosphorous from Di-ammonium phosphate 18-46-0 and Potassium from Potash 0-0-60

TABLE 7

| Ingredient | Stage 1 Vegetative growth | Stage 2 Flowering Stage | Stage 3 Fruit development |
|---|---|---|---|
| Urea | 40 kg/acre | 30 kg/acre | 10 kg/acre |
| Phosphorous | 10 Kg/acre | 10 Kg/acre | — |
| Potassium | 15 Kg/acre | 15 Kg/acre | — |

Treatment No. 2 (T2):—Application of Composition of Invention:

Fertilizer Dosages NPK:—40:4:6 per acre from Urea (Conventional source) and

NPK:—2.25:4.45:2.76 Kg from composition of invention having Example No. 2, 3 and 4 all put together.

TABLE 8

| Composition | Stage 1 Vegetative growth | Stage 2 Flowering Stage | Stage 3 Fruit development |
|---|---|---|---|
| Urea | 20 kg/acre | 10 kg/acre | 10 kg/acre |
| Phosphorous | 2 kg/acre | 2 kg/acre | — |
| Potassium | 3 kg/acre | 3 kg/acre | — |
| Composition as per Example No. 2 | 1 ltr per acre Foliar and 4 Ltr per acre soil drench in water | — | — |
| Composition as per Example No. 3 | — | 2 ltr per acre Foliar and 8 Ltr per acre soil drench in water | — |
| Composition as per Example No. 4 | — | — | 3 ltr per acre Foliar and 07 Ltr per acre soil drench in water |

In T2, the soil applied conventional chemical fertilizers urea is used for supplementing nitrogen at 50% of the recommended dose, whereas phosphorous (P) and potassium (K) are reduced to 20% of the recommended dose. The P and K are supplied from composition of Example No. 2, 3 and 4 in bio-complexed well protected form by the organic acids and peptides. Hence when added in soil resist formation of complexes with cations present in soil and therefore their bioavailability to crop is much better and these fertilizers are required in small quantities.

Treatment No. 3 (T3):—NPK used at 60% of Control+ Foliar Application of Composition of Invention Fertilizer Dosages NPK:—48:12:24 per acre (Urea: Di-ammonium phosphate: Potassium) i.e. NPK 0.24:1.0:0.06 Kg from composition of invention having Example No. 3.

This trial is conducted using chemical fertilizers at 60% of the recommended practice as per used in Control Treatment T1. Additionally in this treatment foliar application of composition of invention as per Example No. 3 applied at 1 Ltr per acre at the dilution of 1:300 at all stages i.e. Stage 1, Stage 2 and Stage 3. So total 3 ltr composition as per Example No. 3 is used.

TABLE 9

Yield Parameter for Maize:-

| Treatment | NPK Dose From Conventional Source | NPK from Invention composition | Farm 1 Qtl/acre | Farm 2 Qtl/acre | Farm 3 Qtl/acre | Average Yield Qtl/acre | Average Yield Increase |
|---|---|---|---|---|---|---|---|
| Treatment (T1) | 80:20:40 | 0 | 35.10 | 36.12 | 35.80 | 35.67 | NA |

TABLE 9-continued

Yield Parameter for Maize:-

| Treatment | NPK Dose From Conventional Source | NPK from Invention composition | Farm 1 Qtl/acre | Farm 2 Qtl/acre | Farm 3 Qtl/acre | Average Yield Qtl/acre | Average Yield Increase |
|---|---|---|---|---|---|---|---|
| Treatment (T2) | 40:04:06 | 2.25:4045:2.76 | 46.3 | 45.40 | 48.80 | 46.73 | +31.0% |
| Treatment (T3) | 48:12:24 | 0.24:1.0:0.06 | 47.30 | 47.00 | 46.20 | 46.83 | +31.28% |

During the whole crop life cycle, the Maize treated with T2 and T3 was much darker i.e. dark green compared to Treatment (T1). The size of the maize fruit was also bigger. During the life cycle of maize, there was excess rain and during high wind lodging of some maize plants was noted in T1 plants, whereas the lodging of plants in treatment T2 and T3 was minimal. This is because of the strong root zone development due to supplementation of bio-complexed nutrients.

Conclusion:—The treatment (T1) is done as per the regular practice of farmer and has normal yield.

In Treatment T2, it is noted that the efficiency of applied urea nitrogen, DAP and Potassium is greatly enhanced and yield is increased by 31% than treatment (T1), even after reducing conventional chemical fertilizers such as urea by 50% and phosphorous and potassium by 80%.

In Treatment T3, the conventional fertilizer dosages are reduced to 60% of regular practice and additionally foliar application of biocomplexed protected nutrients with peptides and organic acids increased the uptake of soil applied chemical fertilizers and provided completely assimilable complex nutrients which increased the yield by 31.28% than the treatment (T1).

Hence, the composition of present application can greatly increase the yields of crops in smaller quantity of fertilizing nutrients.

It has been noted from above trials T2 and T3 that the yield is increased in spite of using lesser quantity of fertilizers. This is because of the fact that there is improvement in the fertilizer utilizations and even lesser dosages resulted better output. Further the foliar application offered biocomplexed nutrients to crops in easily assimilable form which improves the yield.

Example 11

Application of Composition of Present Invention (Example No. 2, 3 and 4) on Paddy/Rice Crop Crop:—Paddy/Rice
Recommended Dose:—N:P:K=32:25:30 kg per acre
Control Dosages:—N:P:K=32:25:30 Kg per acre
Fertilizers used:—Nitrogen from Urea N 46-0-0, Phosphorous from Di-ammonium phosphate 18-46-0 and Potassium from Potash 0-0-60.

TABLE 10

Composition of Example No. 2, 3 and 4

| | Example No. 2 | Composition as per Example No. 2 Used in Stage 1 | Example No. 3 | Composition as per Example No. 3 Used in Stage 2 | Example No. 4 | Composition as per Example No. 4 Used in Stage 3 |
|---|---|---|---|---|---|---|
| Functional Ingredients | | | | | | |
| Nitrogen | 5-20 | 17 | 5-13 | 8 | 5-10 | 6 |
| P2O5 | 5-10 | 10 | 5-40 | 33 | 5-10 | 8 |
| K2O | 5-10 | 6 | 2-4 | 2 | 5-24 | 22 |
| Complexing agents | 6-11 | 10 Citric acid + malic acid | 5-18 | 14 | 15-30 | 24 |
| Peptide | 15-30 | 27 | 15-30 | 19.25 | 15-25 | 21 |
| Phosphopeptide | 5-10 | 8.45 | 5-10 | 8 | 5 | 5 |
| Carbohydrates | 3-6 | 5 Molassses + Jaggaery (1:1) | 3-8 | 5 | 3-6 | 4.55 |
| Trace Minerals | 0.5-2.0 | 1.5 (Zn 20%, Cu10%, Mn-20%, B-5%) | 0.5-1.0 | 0.8 | 0.5-2.0 | 0.5 |
| Vitamins | 0.1 | 0.1 | 0.1-2.0 | 0.15 | 0.1-2.0 | 0.15 |

TABLE 10-continued

Composition of Example No. 2, 3 and 4

| | Example No. 2 | Composition as per Example No. 2 Used in Stage 1 | Example No. 3 | Composition as per Example No. 3 Used in Stage 2 | Example No. 4 | Composition as per Example No. 4 Used in Stage 3 |
|---|---|---|---|---|---|---|
| Non-functional ingredients | | | | | | |
| pH indicators | 0.5-2.0 | 0.8 Methyl Red + Methylene Blue (2:1) | 0.5-2.0 | 0.5 (Methyl Red) | 0.5-2.0 | 0.5 Bromocresol green + Methyl Red in 60:40 |
| Surfactant | 4-8 | 8 | 4-8 | 4 | 4-8 | 4 |
| Penetrator | 3-5 | 5 | 3-5 | 4 | 3-5 | 3 |
| Humectant | 1-2 | 1 | 1-2 | 1 | 1-2 | 1 |
| Defoamer | 0.2 | 0.1 | 0.2 | 0.2 | 0.2 | 0.2 |
| Thickner/Stabilizer | 0.1 | 0.1 | 0.1 | 0.1 | 0.1 | 0.1 |

Application Details:—

Treatment No. 1 (T1):—Control Untreated Application of Conventional Products:

TABLE 11

| Ingredient | Stage 1 Basal Dose | Stage 2 Tillering stage | Stage 3 Panicle Initiation stage |
|---|---|---|---|
| Urea | 11 kg/acre | 11 kg/acre | 10 kg/acre |
| Phosphorous | 25 Kg/acre | — | — |
| Potassium | 30 Kg/acre | — | — |

TABLE 12

Treatment No. 2 (T2): - Application of Composition of invention:-

| Composition | Stage 1 Basal Dose | Stage 2 Tillering stage | Stage 3 Panicle Initiation stage |
|---|---|---|---|
| Urea | 8 Kg/acre | 8 kg/acre | 8 kg/acre |
| Composition as per Example No. 2 | 5 Ltr per acre soil application in water | — | — |
| Composition as per Example No. 3 | — | 2 ltr per acre Foliar and 8 Ltr per acre soil drench in water | — |
| Composition as per Example No. 4 | — | — | 3 ltr per acre Foliar and 05 Ltr per acre soil drench in water |

Treatment No. 3 (T3):—Control+Foliar Application of Composition of Invention

Treatment No. 1+Foliar application of composition of invention as per Example No. 3 applied at 500 ml per acre by foliar application at the dilution of 1:400 at all stages i.e. Stage 1, Stage 2 and Stage 3.

TABLE 13

Yield Results for Paddy/Rice:-

| Treatment | Farm 1 | Farm 2 | Farm 3 | Average Yield/acre | Average Yield Increase |
|---|---|---|---|---|---|
| Control (T1) | 20.40 qtl/acre | 21.50 qtl/acre | 19.80 qtl/acre | 21.76 qtl | NA |
| Treatment (T2) | 28.12 qtl/acre | 29.10 qtl/acre | 29.35 qtl/acre | 28.85 atl/acre | +32.58% |
| Treatment (T3) | 27.20 qtl/acre | 28.90 qtl/acre | 28.05 atl/acre | 28.05 qtl | +28.90% |

It was noted that the crop treated with treatment T2 and T3 were dark green in nature during all the stages and having broad leaf. The crop was less susceptive to the fungal attack during the crop cycle. The weight per 1000 grains was also higher in treatment T2 and T3.

Example 12

Application of Composition of Present Invention (Example No. 3 and 5) on Cotton Crop Along With Herbicide Glyphosate The cotton crop was treated with glyphosate at 1 Ltr per acre with plain water and Glyfosate used with the composition of Example 3 and 5 was used at 750 ml/acre.

The water was treated with composition of example 3 and 5 as given in Table 15 at 2 to 3 ml per ltr of water till the pH of 4.5 and 4.2 is achieved as indicated by the color achieved to the water.

TABLE 14

| Treatment | Dosage of Glyfosate | pH of Glyfosate spray solution | Color of treated water before addition of Glyfosate | Control of weeds | % Increase over Control |
|---|---|---|---|---|---|
| Control | 1 Ltr/acre | 7.65 | Colorless | 72% | — |
| Composition of Example No. 3 | 750 ml/acre | 4.5 | Pink | 95% | 32% |
| Composition of Example No. 5 | 750 ml/acre | 4.20 | Purple | 98% | 36% |

The glyphosate efficiency is increased using the composition of inventions and even at lower dosages of weedicide excellent control of weeds is achieved.

Example 13

Application of Composition of Present Invention (Example No. 3 and 5) on Tomato Along With Cypermethrin The following compositions are used in the treatment for Tomato:

TABLE 15

| | Composition as per Example No. 3 Parts/parts | Composition as per Example No. 3 Parts/parts | Example No. 5 | Composition as per Example No. 5 used in above experiment Parts/parts |
|---|---|---|---|---|
| Functional Ingredients | | | | |
| Nitrogen | 5-13 | 8 | 5-8 | 6 |
| P2O5 | 5-40 | 33 | 10-35 | 33 |
| K2O | 2-4 | 2 | 2 | 2 |
| Complexing agents | 5-18 | 14 | 10-20 | 18 |
| Peptide | 15-30 | 19.25 | 15-18 | 18 |
| Phosphopeptide | 5-10 | 8 | 5-10 | 8 |
| Carbohydrates | 3-8 | 5 | 5 | 5 |
| Trace Minerals | 0.5-1.0 | 0.8 | 0.5 | 0.5 |
| Vitamins | 0.1-2.0 | 0.15 | 0.1-2.0 | 0.1 |
| Non-functional ingredients | | | | |
| pH indicators | 0.5-2.0 | 0.5 (Methyl Red) | 0.5-2.0 | 0.5 (methyl red + meth blue) |
| Surfactant | 4-8 | 4 | 4-8 | 5 |
| Penetrator | 3-5 | 4 | 3 | 3 |
| Humectant | 1-2 | 1 | 1 | 1 |
| Defoamer | 0.2 | 0.2 | 0.2 | 0.2 |
| Thickner/Stabilizer | 0.1 | 0.1 | 0.1 | 0.1 |

Tomato crop infested with worms was sprayed with Cypermethrin 25% EC using normal well water and well water treated with the compositions of the invention. 4000 Sq. meter was treated only with water and another 8000 square meter plot was treated with composition of the invention as per Example No. 3 or 5. In both the plots, pest is controlled. In treated plot, the pest control is achieved at 95% and with 15% saving in the dosage of cypermethrin pesticide.

Further, it is noted that in 8000 sq. meter treated plot, the crop was lush green with lot more fruits and fungal attack was almost nil and only 1 round of fungicide as preventative is applied. Whereas in 4000 square meter control plot 2 rounds of fungicides are used in order to control the fungal attack.

This shows that the use of organic fertilizer compositions of the present invention improves the plant health making them stronger and increases the systemic resistance of plants towards fungus.

TABLE 16

| Treatment Crop Tomato | Dosage of Cypermethrin | Quantity of composition | pH of Cypermethrin Spray solution | Color of treated water before addition of Glyfosate | Control of Pest worms | % Saving of Insecticide Control |
|---|---|---|---|---|---|---|
| Control | 150 ml/acre | NIL | 7.20 | Colorless | 78% | 0% |
| Composition of Example No. 3 | 125 ml/acre | 2 Ltr per 8000 sq. meter | 4.2 | Red | 94% | 20.51% |
| Composition of Example No. 5 | 125 ml/acre | 2 Ltr per 8000 sq. meter | 4.5 | Purple | 96% | 23.07% |

I claim:

1. A multifunctional organic bio-complexed agricultural composition comprising a nutrient source and a phosphopeptide; wherein a pH of the composition is less than 3 so as to slow down the volatilization of urea in soil and to inhibit the complexation of the nutrient sources with cations in soil or hard water salts in water;
wherein said phosphopeptide comprises a complexation product of;
an organic acid;
a bio-complexing agent; and
a phosphorous source.

2. The multifunctional agricultural composition according to claim 1, wherein said composition further comprises a complexing agent, a peptide, a carbohydrate source, a mineral, a vitamin, a pH indicator, a humectant, a surfactant, a defoamer, an antifoaming agent, a penetrating agent, a thickener, a stabilizer, or a mixture thereof.

3. The multifunctional agricultural composition according to claim 2, wherein the Complexing agent is selected from the group consisting of Organic acids, Inorganic acids, natural amino acids, synthetic amino acids, and mixtures thereof, present in an amount of 5% to 35% of the multifunctional agricultural composition.

4. The multifunctional agricultural composition according to claim 3, wherein the organic acids are selected from the group consisting of an amino acid, a carbohydrate acid, a carboxylic acid, Citric acid, malic acid, Maleic acid, itaconic acid, polymaleic acid, polyaspartic acid, fumaric acid, malonic acid, tartaric acid, oxalic acid, phthalic acid, glycolic acid, lactic acid, propionic acid, malic acid, succinic acid, acrylic acid, ascorbic acid, gluconic acid, glacial acetic acid, vinegar, propionic acid, formic acid, butyric acid, butanoic acid, fulvic acid, humic acid, folic acid, EDTA, Nitrilotriacetic acid (NTA), DTPA (Diethylene Triamine Penta Acetic Acid), EDTA salts, Hydroxy ethylidine Phosphonic acid (HEDP), Adenosine monophosphate (AMP), amino-tris(methylenephosphonic acid), lignosulfonic acid, glucoheptanioc acid, gluconic acid, glutaric acid, glucaric acid, glucoronic acid, ribonic acid, mannoric acid, arabonic acid, galactonic acid, mannuronic acid, erythronic acid, threnic acid, xylonic acid, and mixtures thereof.

5. The multifunctional agricultural composition according to claim 2, wherein the Carbohydrate source is selected from the group consisting of molasses, sugar, cane sugar, jiggery, sugar alcohols, mannitol, sorbitol, glycerine, and mixtures thereof, present in an amount of 3% to 10% of the multifunctional agricultural composition.

6. The multifunctional agricultural composition according to claim 2, wherein the mineral is a salt of an inorganic, complexed, or chelated metal selected from the group consisting of zinc, iron, copper, manganese, boron, molybdenum, silicon, sulphur, magnesium, calcium, cobalt, and vanadium.

7. The multifunctional agricultural composition according to claim 2, wherein the Vitamin is selected from the group consisting of Vitamin C, Vitamin B12, B1, B6, Inositol, Folic acid, Choline, salts thereof, and mixtures thereof.

8. The multifunctional agricultural composition according to claim 2, wherein the composition comprises at least one member selected from the group consisting of:
a) a pH indicator selected from the group consisting of Methyl Red, Methyl Red +Methylene blue screened, Alizarin Red S +methylene Blue, bromocresol green +Methyl Red, bromocresol green +methylene blue, bromocresol green, p-nitrophenol +methylene blue, Ethyl Red +Methylene blue, 2,5 di-nitrophenol, 2,5 di-nitrophenol +Methylene blue, bromoxylenol blue, Methyl yellow, methyl orange, Bromothymol Blue +Methylene Blue +Methyl Red, Naphtyl Red, Bromophenol red, chlorophenol red, alizarin red, cochineal, Azolitmin, Bromophenol blue, Congo Red, Resazurin, P-nitrophenol, Bromocresol purple, Bromothymol blue, a universal pH indicator, and mixtures thereof;
b) a humectant selected from the group consisting of sugar alcohols, glycerine, sorbitol, mannitol, xylitol, maltitol, honey, glycols, ethylene glycol, propylene glycol, polyethylene glycol, urea, and mixtures thereof;
c) a surfactant selected from the group consisting of a Nonionic surfactant, an anionic surfactant, a Nonylphenol-ethylene oxide condensate, a Tallow amine ethylene oxide condensate, a Sorbitan monooleate, a silicone surfactant, a polysiloxane based surfactant, a Sodium lauryleth sulfate, SLS, a Linear alkyl benzene sulfonic acid, a dioctyl sulfosuccinate, an alkyl olefin sulfonate, soapnut extract, Yucca extract, and mixtures thereof;
d) a penetrating agent selected from the group consisting of alcohols, pine extracts, natural oils, and petroleum oils;
e) a defoamer or an antifoaming agent selected from the group consisting of silicone defoamers, kerosene defoamers, wax defoamers, oil based deformers, turkey red oil, fatty acid based defoamers, and mixtures thereof; and
f) a thickener or a stabilizer selected from the group consisting of Carboxymethyl cellulose (CMC), guar gum, locust bean gum, xanthan gum, natural gums, hydroxyethylcellulose (HEC), HPMC, acrylates, polyacrylamide (PAM), PVP, mixtures thereof and combinations of synthetic polymers and carbomers.

9. The multifunctional agricultural composition according to claim 1, wherein said Nutrient source is selected from the group consisting of a nitrogen source, a phosphorus source, a potassium source, and a mixture thereof;
wherein said Nutrient source is present in an amount of 5% to 45% of the multifunctional agricultural composition.

10. The multifunctional agricultural composition according to claim 9, wherein the Nitrogen source is selected from the group consisting of anhydrous ammonia, liquor ammonia, urea, urea phosphate, thiourea, ammonium sulfate, ammonium nitrate, potassium nitrate, ammonium phosphate, ammonium polyphosphate, ammonium chloride, di-ammonium phosphate, urea triazone, proteins, peptides, nucleic acids, a yeast extract, amino acids, aromatic nitrogen or heterocyclic nitrogen compounds, hexamethylene tetraamine, melamine, nitrobenzene, and mixtures thereof; present in an amount of 5% to 30% of the multifunctional agricultural composition.

11. The multifunctional agricultural composition according to claim 9, wherein the Phosphorous source is selected from the group consisting of Phosphate salts, phosphoric acid, super phosphoric acid, phosphorous acid, polyphosphoric acid, HEDP (1-hydroxyethane 1,1-diphosphonic acid), AMP (Adenosine monophosphate), amino-tris(methylenephosphonic acid), phosphorous pentoxide, phosphite salts, mono ammonium phosphate MAP, Di-ammonium phosphate, natural phosphate minerals, Rock phosphate, bone meal, and mixtures thereof, present in an amount of 5% to 45% of the multifunctional agricultural composition.

12. The multifunctional agricultural composition according to claim 9, wherein the Potassium source is selected from the group consisting of potassium salts with organic or inorganic acids, Potassium chloride, potassium sulfate, potassium nitrate, potassium phosphate, potassium dihydrogen phosphate, di-potassium phosphate, mono-potassium acetate, potassium formate, potassium carbonate, potassium bicarbonate, tripotassium polyphosphate, potassium citrate, potassium acetate, potassium propionate, butyrate, potassium lactate, potassium phosphite, potassium hydroxide, potassium carbonate, potassium bicarbonate, tripotassium polyphosphate, potassium citrate, and natural potassium minerals, and mixtures thereof, present in an amount of 2% to 35% of the multifunctional agricultural composition.

13. The multifunctional agricultural composition according to claim 1, wherein the multifunctional agricultural composition has at least one function selected from the group consisting of a Fertilizer, a nutrient, a Bio-stimulant, a Complexing agent, a pH controller, a pH correctors, pH indicator, a hard water salts inactivator, a surface tension reducer, a spreader, an alkaline hard water ill effects mitigator, an adjuvant, a penetrator, a water conditioner, and a drip irrigation system cleaner.

14. The multifunctional agricultural composition according to claim 1, wherein the bio-complexing agent is selected from the group consisting of peptides, amino acids, and hydrolyzed proteins.

15. The multifunctional agricultural composition according to claim 1, wherein the composition is prepared in a form selected from the group consisting of a solid powder, a granule, a paste, a liquid, a gel, a pellet, a pill, a capsule, or a tablet.

16. A method of using the multifunctional agricultural composition according to claim 1, wherein the composition is applied to a plant by:
    applying the composition to a leaf of the plant by foliar spraying;
    applying the composition to the plant by mixing the composition with soil;
    applying the composition to the plant by mixing the composition with irrigation water or fertilizers;
    applying the composition to the plant by impregnating or coating the composition on fertilizers; or
    applying the composition to the plant in admixture with pesticides, weedicides or plant growth regulators.

17. A multifunctional organic bio-complexed agricultural composition comprising a Nutrient source and a Phosphopeptide;
    wherein a pH of the composition is less than 3 so as to slow down the volatilization of urea in soil and to inhibit the complexation of the Nutrient source with cations in soil or hard water salts in water;
    wherein said phosphopeptide is complexed with an organic acid.

18. A multifunctional organic bio-complexed agricultural composition comprising a nutrient source and a phosphopeptide; wherein a pH of the composition is less than 3 so as to slow down the volatilization of urea in soil and to inhibit the complexation of the nutrient sources with cations in soil or hard water salts in water, wherein said phosphopeptide is complexed with an organic acid;
    wherein the multifunctional agricultural composition is prepared by a method comprising,
        a) Reacting thoroughly the nutrient source and the phosphopeptide at 50-90° C. with a high speed stirrer for 8-18 hours in a glass lined reactor to obtain a reacted mass;
        b) milling the reacted mass of step (a) in a wet mill, ball mill, sand mill or air jet milling machine to get particles of the multifunctional agricultural composition having a size of about 100 nanometer to 10 micron; and
        c) maintaining the pH of the final composition at less than 3 using an acid.

19. A method of making a multifunctional organic bio-complexed agricultural composition comprising a nutrient source and a phosphopeptide;
    wherein a pH of the composition is less than 3 so as to slow down the volatilization of urea in soil and to inhibit the complexation of the nutrient sources with cations in soil or hard water salts in water,
    wherein the method comprises,
    reacting the nutrient source and the phosphopeptide at 50-90° C. with a high speed stirrer for 8-18 hours in a glass lined reactor to obtain a reacted mass;
    milling the reacted mass in either in wet mill, ball mill, sand mill or air jet milling machine to get fine micron sized particles of a final composition having a size of 100 nanometer to 10 micron; and
    maintaining the pH of the final composition acidic at less than 3 using an acid.

20. The method of claim 19, wherein the phosphopeptide is complexed with an organic acid.

* * * * *